June 12, 1956　　　C. W. McCLURE　　　2,749,624
APPARATUS FOR DETERMINING THE PROFILE OF THREADS
Filed May 21, 1953　　　　　　　　　　　　2 Sheets-Sheet 1
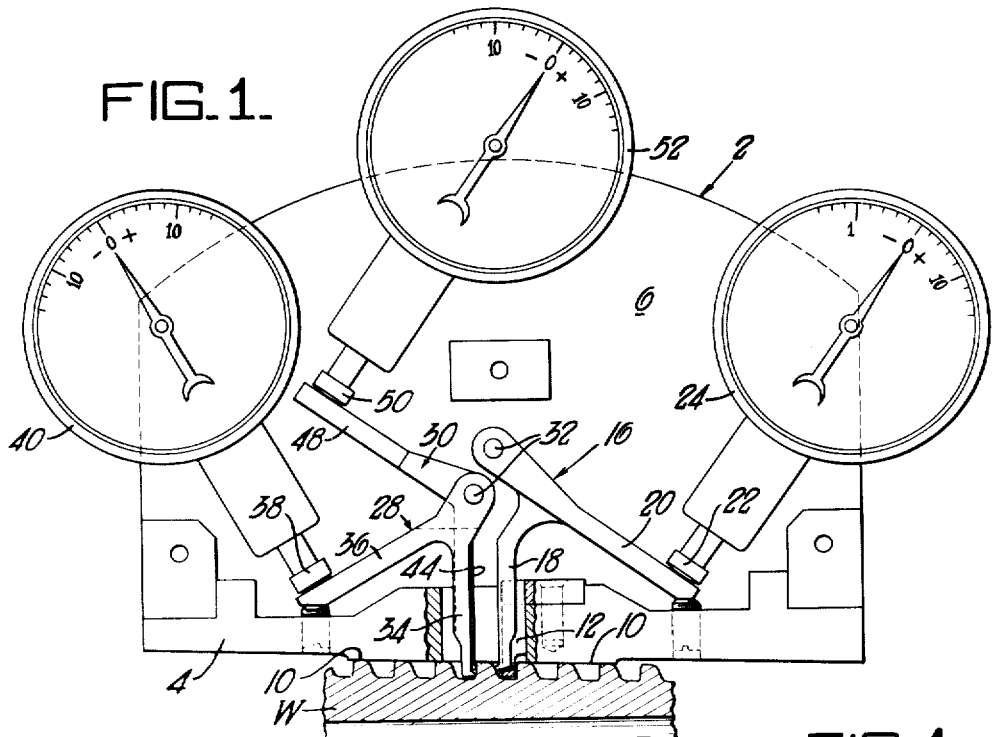
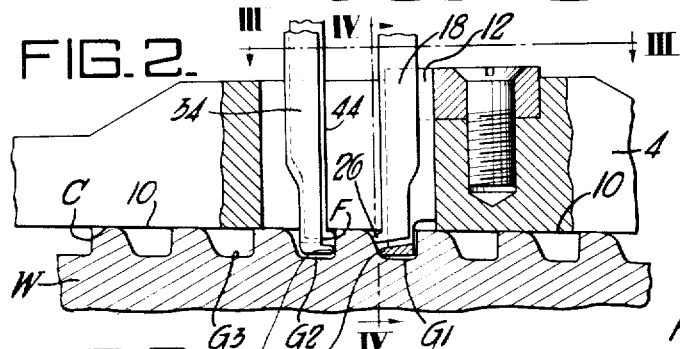
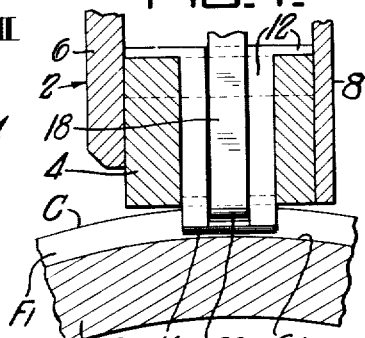
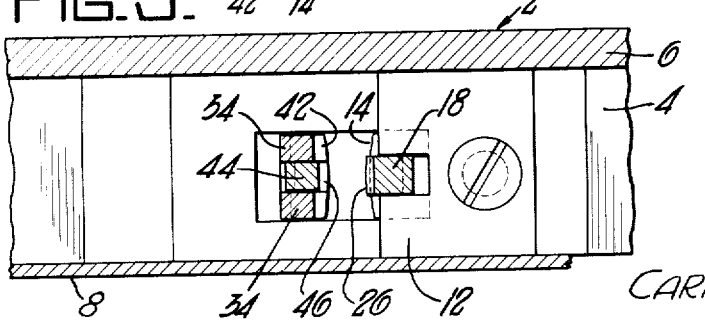
*Inventor:*
CARROLL W. McCLURE,
by: Donald G. Dalton
his Attorney.

June 12, 1956 C. W. McCLURE 2,749,624
APPARATUS FOR DETERMINING THE PROFILE OF THREADS
Filed May 21, 1953
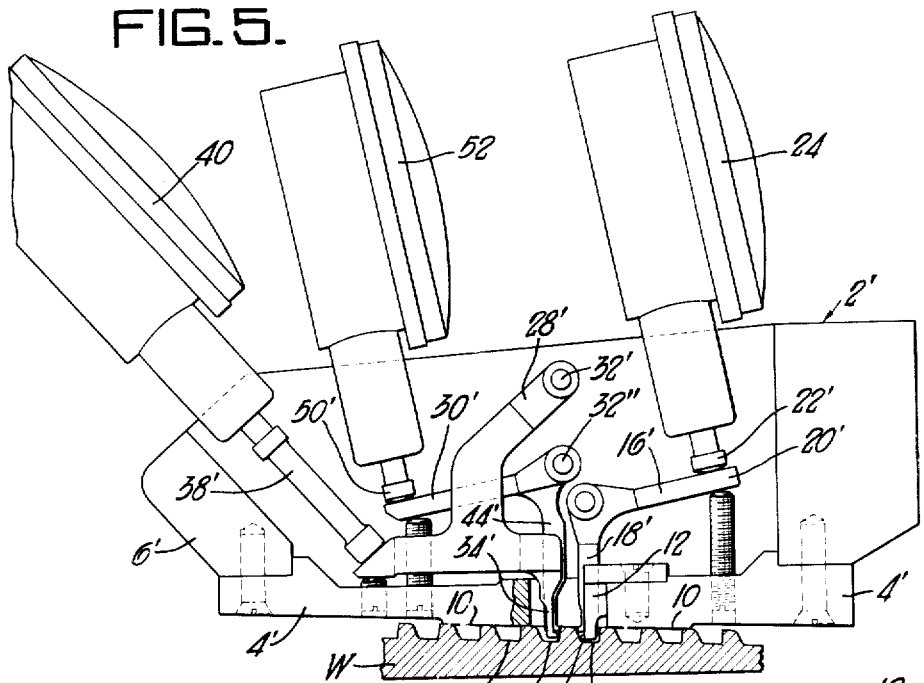
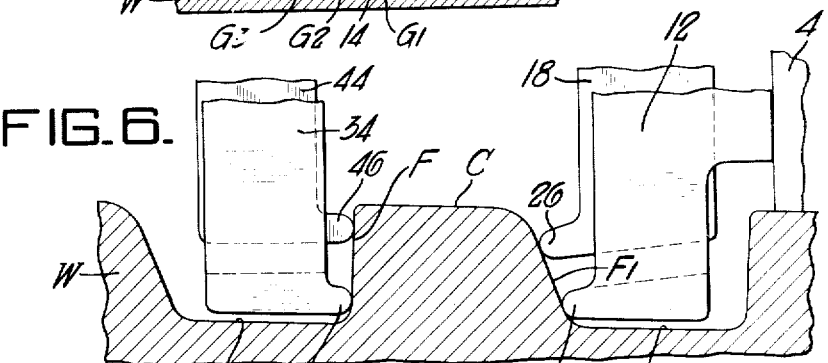
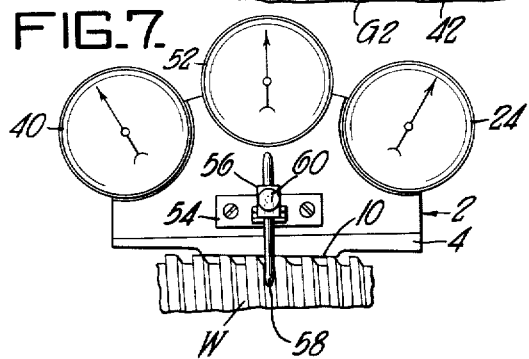
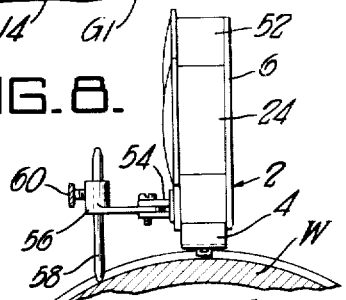
Inventor:
CARROLL W. McCLURE,
by: Donald G. Dalton
his Attorney.

United States Patent Office 2,749,624
Patented June 12, 1956

2,749,624

APPARATUS FOR DETERMINING THE PROFILE OF THREADS

Carroll W. McClure, McKeesport, Pa., assignor to United States Steel Corporation, a corporation of New Jersey Application May 21, 1953, Serial No. 356,330

7 Claims. (Cl. 33—199)

This invention relates to apparatus for determining the profile of threads and more particularly for determining the profile of threads such as shown in the patent to Willke No. 2,505,747 and in the copending application to Webb, Serial No. 283,535, filed April 22, 1952. The Webb thread is unsymmetrical about its vertical axis, has a small included angle between flanks and has a relatively shallow thread depth. The Willke thread also has some of these characteristics which makes it unsuitable for checking the thread form in the conventional manner. The two most common methods for checking thread form are by the use of comparators and by means of a ball point on the spindle end of a dial indicator gauge placed in the groove between thread flanks. In using comparators the end of a pipe having the thread thereon must be cut off and it is therefore suitable as a spot check only. In checking thread form by gauge measurement the ball point will cause the dial to point to zero when the thread form is perfect. If the thread form is not perfect the ball will bear on the thread either below or above the point where it bears when the thread is perfect. Due to the wide thread groove and the exceptionally steep angles of the thread flanks the use of the ball point indicator gauge is impractical for gauging the threads discussed above.

It is therefore an object of my invention to provide a gauge which is suitable for checking the thread form regardless of the flank angles, the thread width, and the thread depth.

This and other objects will be more apparent after referring to the following specification and attached drawings, in which:

Figure 1 is a view of the gauge of my invention in place on a pipe with the front cover removed;

Figure 2 is an enlarged detail view, partly in section, of the lower part of my gauge;

Figure 3 is a view taken on the line III—III of Figure 2;

Figure 4 is a view taken on the line IV—IV of Figure 2;

Figure 5 is a view similar to Figure 1 showing a modified gauge in place on a coupling;

Figure 6 is an enlarged view of a detail;

Figure 7 is a view showing an attachment for my gauge; and

Figure 8 is a side view of Figure 7.

Referring more particularly to the drawings, the reference character W indicates the workpiece which is provided with thread grooves G1, G2 and G3. The workpiece W may be a pipe or coupling. In the first instance the threads will be on the outside of the pipe and in the second instance the threads will be on the inside of the coupling. Each thread has a relatively steep flank F and a relatively sloping flank F1. The gauge of my invention is provided with a supporting frame 2 which consists of an anvil 4, a back plate 6, and a front cover 8 detachably secured to the anvil. The anvil 4 is provided with bottom surfaces 10 for bearing against the crests C of the threads. A leg 12 is secured to the member 4 and has a toe or contact point 14 adapted to bear against the flank F1 adjacent the bottom end thereof at the end of the straight portion of the thread as best shown in Figure 6. The spacing between the surface 10 and the bottom of the leg 12 is such that the leg cannot touch the bottom of the groove when the surface 10 is bearing against the crests C. A bell crank lever 16 is pivotally mounted on the frame 2 with one leg 18 extending substantially vertically downwardly into the groove G1 adjacent the leg 12 and the other leg 20 extending at an angle thereto to a point adjacent the spindle 22 of a gauge 24 mounted on the frame 2. A toe or contact point 26 is provided at the bottom of the leg 18 and is adapted to contact the flank F1 adjacent the top part thereof. The legs 18 and 20 are preferably of the same length so that the spindle 22 will move the same distance as the toe 26. The length of the leg 18 is such that the movement of the toe 26 will be approximately in a straight line. Second and third bell crank levers 28 and 30 are pivotally mounted on a pin 32 supported by the frame 2. The lever 28 has a substantially vertical bifurcated leg 34 extending downwardly into the groove G2 adjacent the groove G1 and a second leg 36 extending to a point adjacent the spindle 38 of a gauge 40 mounted on the frame 2. The leg 34 has a toe or contact point 42 facing the toes 14 and 26 which is adapted to contact the lower part of the flank F. The legs 34 and 36 are preferably of the same length. The lever 30 has a substantially vertical leg 44 extending downwardly into the groove G2 between the bifurcations of the leg 34. The leg 44 is provided with a toe or contact point 46 which is adapted to contact the upper part of the flank F. The other leg 48 of the lever 30 contacts the spindle 50 of a gauge 52 mounted on the frame 2. The legs 44 and 48 are preferably of the same length.

Figures 7 and 8 disclose a steady-rest for positioning and steadying the gauge on the pipe. The steady-rest consists of a bracket 54 attached to the frame 2, a member 56 pivotally secured thereto, and a leg 58 adjustably mounted in the member 56 and secured thereto by means of a set screw 60. The steady-rest is adaptable to various pipe sizes by swinging the member 56 about its pivot and adjusting the leg 58 so that it rests in the thread root.

The operation of my device is as follows. Before placing the gauge in operation it is checked on a perfect thread form with the surfaces 10 bearing against the crest of the thread. The toe 14 is held in firm engagement with the lower part of thread flank F1 and toe 26 will engage the upper part of thread flank F1. Toes 42 and 46 will then engage the lower and upper parts respectively of the opposite thread flank F. The dial indicator gauges 24, 40 and 52 will be set to indicate zero. The gauge is then placed on the threads to be tested with the parts thereof assuming the same relative positions as when being checked on the perfect or master thread form. If the thread is properly formed the readings on all three gauges will be zero. If the threads are not properly formed the reading on at least one of the gauges will vary from zero. For example, if the gauge 24 reads —.005″ it will indicate that the angle of the flank F1 is excessively large. If the gauges 40 and 52 read —.003 and —.006″, respectively, it indicates that the angle of flank F is also large and furthermore that the thread is .003″ narrower than it is supposed to be. If the reading on gauge 24 is zero and the readings on gauges 40 and 52 are —.003″ it would be an indication that the flank angles are correct but that the thread is .003″ narrow.

Figure 5 shows an embodiment of my invention particularly adapted for determining the profile of an internal thread in a coupling. In this embodiment the dials of gauges 24, 40 and 52 are turned as shown so that the dials can be easily read and the arrangement of the levers is slightly different than in Figure 1. The reference numerals have been primed in Figure 5 to indicate parts corresponding to those of Figure 1. It will be seen that lever 28′ has been mounted on a pivot pin 32′ separate from the pivot pin 32" for the lever 30'. The operation of this device is otherwise the same as that of Figure 1.

While two embodiments of my invention have been shown and described it will be apparent that other adaptations and modifications may be made without departing from the scope of the following claims.

I claim:

1. Apparatus for determining the profile of threads comprising a supporting frame, a relatively stationary leg carried by said frame extending downwardly into a thread groove and having a toe thereon adapted to contact a flank of said thread adjacent one end thereof, a second leg pivotally mounted on said frame extending into said groove, a toe on said leg adapted to contact said flank adjacent the other end thereof, a third leg pivotally mounted on said frame extending into another thread groove, a toe on said last named leg adapted to contact the opposite flank of said thread adjacent the bottom thereof, a fourth leg pivotally mounted on said frame and extending into said last named groove, and a toe on said last named leg adapted to contact the last named flank adjacent the top thereof.

2. Apparatus for determining the profile of threads comprising a supporting frame, a relatively stationary leg carried by said frame extending downwardly into a thread groove and having a toe thereon adapted to contact a flank of said thread adjacent one end thereof, a second leg pivotally mounted on said frame extending into said groove, a toe on said leg adapted to contact said flank adjacent the other end thereof, a third leg pivotally mounted on said frame extending into another thread groove, a toe on said last named leg adapted to contact the opposite flank of said thread adjacent the bottom thereof, a fourth leg pivotally mounted on said frame extending into said last named groove, a toe on said last named leg adapted to contact the last named flank adjacent the top thereof, and an anvil on said support bearing against the crests of said threads to position said toes.

3. Apparatus for determining the profile of threads comprising a supporting frame, a relatively stationary leg carried by said frame extending downwardly into a thread groove and having a toe thereon adapted to contact a flank of the thread adjacent one end thereof, a bell crank lever pivotally mounted on said supporting frame, one leg of said lever extending into said groove, a toe on said one leg adapted to contact said flank adjacent the other end thereof, a second bell crank lever pivotally mounted on said supporting frame, one leg of said second lever extending into a thread groove adjacent the first named groove, a toe on said last named leg adapted to contact the opposite flank of said thread adjacent the bottom end thereof, a third bell crank lever pivotally mounted on said supporting frame, one leg of said third lever extending into the last named groove, a toe on said last named leg adapted to contact the last named flank adjacent the top end thereof, and three gauges supported by said frame, the second leg of each of said levers adapted to bear against the spindle of one of said gauges.

4. Apparatus for determining the profile of threads comprising a supporting frame, a relatively stationary leg carried by said frame extending downwardly into a thread groove and having a toe thereon adapted to contact a flank of the thread adjacent one end thereof, a bell crank lever pivotally mounted on said supporting frame, one leg of said lever extending into said groove, a toe on said one leg adapted to contact said flank adjacent the other end thereof, a second bell crank lever pivotally mounted on said supporting frame, one leg of said second lever extending into a thread groove adjacent the first named groove, a toe on said last named leg adapted to contact the opposite flank of said thread adjacent the bottom end thereof, a third bell crank lever pivotally mounted on said supporting frame, one leg of said third lever extending into the last named groove, a toe on said last named leg adapted to contact the last named flank adjacent the top end thereof, three gauges supported by said frame, the second leg of each of said levers adapted to bear against the spindle of one of said gauges, and an anvil on said support bearing against the crests of said threads to position said toes.

5. Apparatus for determining the profile of threads comprising a supporting frame, a relatively stationary leg carried by said frame extending downwardly into a thread groove and having a toe thereon adapted to contact a flank of the thread adjacent one end thereof, a bell crank lever pivotally mounted on said supporting frame, the legs of said lever being equal in length with one leg extending into the said groove, a toe on said one leg adapted to contact said flank adjacent the other end thereof, a second bell crank lever pivotally mounted on said supporting frame, the legs of said second lever being equal in length with one leg extending into a thread groove adjacent the first named groove, a toe on said last named leg adapted to contact the opposite flank of said thread adjacent the bottom end thereof, a third bell crank lever pivotally mounted on said supporting frame, the legs of said third lever being equal in length with one leg extending into the last named thread groove, a toe on said last named leg adapted to contact the last named flank adjacent the top end thereof, and three gauges supported by said frame, the second leg of each of said levers adapted to bear against the spindle of one of said gauges.

6. Apparatus for determining the profile of threads comprising a supporting frame, a relatively stationary leg carried by said frame extending downwardly into a thread groove and having a toe thereon adapted to contact a flank of the thread adjacent one end thereof, a bell crank lever pivotally mounted on said supporting frame, the legs of said lever being equal in length with one leg extending into the said groove, a toe on said one leg adapted to contact said flank adjacent the other end thereof, a second bell crank lever pivotally mounted on said supporting frame, the legs of said second lever being equal in length with one leg extending into a thread groove adjacent the first named groove, a toe on said last named leg adapted to contact the opposite flank of said thread adjacent the bottom end thereof, a third bell crank lever pivotally mounted on said supporting frame, the legs of said third lever being equal in length with one leg extending into the last named thread groove, a toe on said last named leg adapted to contact the last named flank adjacent the top end thereof, three gauges supported by said frame, the second leg of each of said levers adapted to bear against the spindle of one of said gauges, and an anvil on said support bearing against the crests of said threads to position said toes.

7. Apparatus for determining the profile of threads comprising a supporting frame, a relatively stationary leg carried by said frame extending downwardly into a thread groove and having a toe thereon adapted to contact a flank of said thread adjacent one end thereof, a second leg pivotally mounted on said frame extending into said groove, a toe on said leg adapted to contact said flank adjacent the other end thereof, a third leg pivotally mounted on said frame extending into another thread groove, a toe on said last named leg adapted to contact the opposite flank of said thread adjacent the bottom thereof, a fourth leg pivotally mounted on said frame and extending into said last named groove, a toe on said last named leg adapted to contact the last named flank adjacent the top thereof, means for positioning said toes with respect to the crests of said threads, and means for indicating the positions of said movable toes.

References Cited in the file of this patent

UNITED STATES PATENTS 1,588,963    Harter  ---------------- June 15, 1926

FOREIGN PATENTS 347,409    Germany  -------------- Jan. 20, 1922

Dedication 2,749,624.—*Carroll W. McClure*, McKeesport, Pa. APPARATUS FOR DETERMINING THE PROFILE OF THREADS. Patent dated June 12, 1956. Dedication filed Apr. 5, 1962, by the assignee, *United States Steel Corporation*.

Hereby dedicates said Letters Patent to the people of the United States.
[*Official Gazette May 22, 1962.*]